(No Model.)
N. R. WILSON.
SEED PLANTER AND FERTILIZER DISTRIBUTER.
No. 259,623. Patented June 13, 1882.
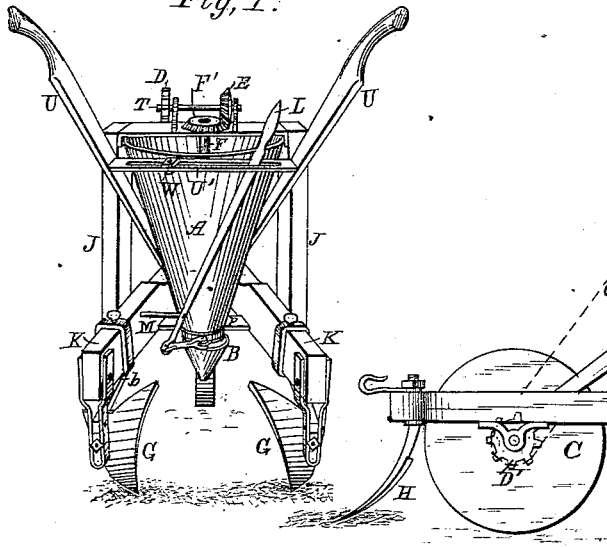
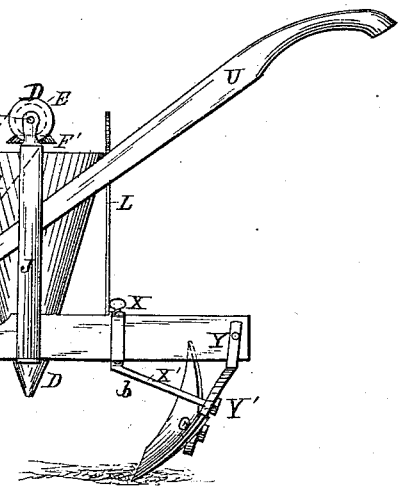
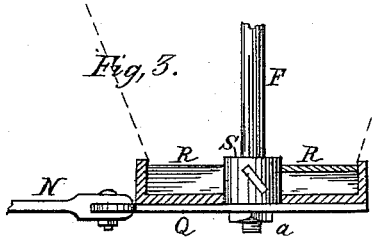
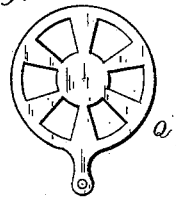
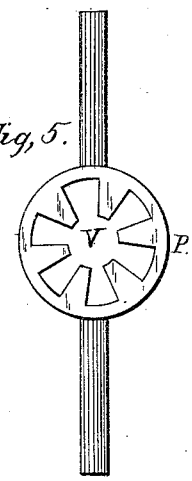
WITNESSES
Noah R. Wilson
INVENTOR,
by Louis Bagger & Co.
Attorneys
N. PETERS. Photo-Lithographer. Washington. D. C.

UNITED STATES PATENT OFFICE.

NOAH R. WILSON, OF PIEDMONT, SOUTH CAROLINA.

SEED-PLANTER AND FERTILIZER-DISTRIBUTER.

SPECIFICATION forming part of Letters Patent No. 259,623, dated June 13, 1882.

Application filed December 19, 1881. (No model.)

*To all whom it may concern:*

Be it known that I, NOAH R. WILSON, of Piedmont, in the county of Greenville and State of South Carolina, have invented certain new and useful Improvements in Seed-Planter and Fertilizer-Distributer; and I do hereby declare that the following is a full, clear, and exact description of the invention, which will enable others skilled in the art to which it appertains to make and use the same, reference being had to the accompanying drawings, which form a part of this specification, and in which—

Figure 1 is a rear elevation of my improved seed-planter and fertilizer-distributer. Fig. 2 is a side elevation, and Figs. 3, 4, and 5 are detail views thereof.

This invention has relation to improvements in a combined seed-planter and fertilizer-distributer; and it consists in the detailed construction and arrangement of parts, substantially as hereinafter more fully set forth.

Referring to the accompanying drawings, A indicates the hopper for holding the cotton, corn, or other seed or the fertilizer or guano to be distributed. The lower end or bottom of the hopper has affixed to it a funnel, B, to concentrate the dropping seed or fertilizer.

Arranged in the bottom of the hopper is a circular chamber or ring, P, having arms extending from opposite points thereon, which are bolted to the underside of the beams. This chamber has a central opening, V, from which radiate a series of circularly-arranged openings, as seen in Fig. 5. The bottom of the chamber P is covered by a corresponding perforated disk, Q, adapted to be supported and turned under the chamber P, it being designed to permit of the dropping or cut off the dropping of the seed or fertilizer.

A shaft, F, extends centrally up through the hopper A, having its lower end, which passes through the opening V of the chamber P, bearing in the disk Q, while its upper end, bearing in a cross-piece of a frame, J, is provided with a beveled pinion, F', which engages with a pinion, E.

The pinion E is supported upon a shaft, T, hung in bearings secured upon the cross-piece of the frame J, and is provided with a second toothed wheel, D, around which passes an endless chain-belt, O, also encompassing a toothed or sprocket wheel, D', on the shaft of the driving-wheel C. This imparts motion to the shaft F, which operates the seed or fertilizer stirrers on said shaft.

The hopper A is supported between the upright frame J, to which the handles U, in addition to being fastened to the beams K, is also fastened. The uprights of the frame J are secured to the converging beams K.

L is a hand-lever adapted to be moved in a slotted cross piece or bar, U', which is graduated to a scale, as seen in Fig. 1, and has a nutted screw, W, to arrest the lever at the desired point. This lever is fulcrumed upon a bar, M, projecting from one of the beams K, and connected, as at N, to the disk Q. By means of this lever the size of the seed-openings can be varied to the exact width by observing the scale on the bar U' during the movement of the lever, and thus regulate the dropping of the seed or fertilizer.

R is the seed or fertilizer stirrers, affixed to a hub, S, screwed upon the shaft F, it being nutted upon the disk Q, as at *a*.

H is the furrow-opening plow or shovel, affixed to the front convergent ends of the beams, K, and G G are the covering shovels or plows, detachably connected to the rear ends of the beams K, as at Y. They are also capable of being set at the desired inclination to the ground by means of the sliding yokes *b*, having adjusting-screws X and inclined arms X', connected by screws Y' to the slotted standards of said plows, as seen in Fig. 2.

Having thus fully described my invention, I claim and desire to secure by Letters Patent—

In a seed and fertilizer dropper, the combination of hopper A, having the perforated disk P, cone B, and movable disk or slide Q, lever L, connected to said disk Q, beams K, having the handles U, the graduated slotted cross-bar U', secured to and between the handles U and receiving the lever L, and nut W, substantially as and for the purpose set forth.

In testimony that I claim the foregoing as my own I have hereunto affixed my signature in presence of two witnesses.

NOAH REEVE WILSON.

Witnesses:
JAMES F. WEBSTER,
EDWARD CROFT.